United States Patent [19]
Roth

[11] Patent Number: 6,073,433
[45] Date of Patent: Jun. 13, 2000

[54] PLASTIC COVER FOR BALER NETTING STORAGE DEVICE

[75] Inventor: Arsene Roth, Metz, France

[73] Assignee: Usines Claas France, Metz Woippy, France

[21] Appl. No.: 09/044,430

[22] Filed: Mar. 19, 1998

[30] Foreign Application Priority Data

Mar. 21, 1997 [DE] Germany ............................ 197 11 742

[51] Int. Cl.⁷ ............................ A01D 39/00; B65B 11/56
[52] U.S. Cl. .................................. 56/341; 53/118; 53/587
[58] Field of Search ............................ 53/118, 587, 389, 53/389.4, 389.3; 242/596.8, 597.8, 598.6; 56/341, 343

[56] References Cited

U.S. PATENT DOCUMENTS

| | | |
|---|---|---|
| 4,597,241 | 7/1986 | Clostermeyer ........................ 53/587 X |
| 4,599,844 | 7/1986 | Clostermeyer et al. .................. 53/118 |
| 4,676,046 | 6/1987 | Verhulst et al. ........................ 53/118 |
| 5,243,806 | 9/1993 | Jennings et al. ........................ 53/118 |

FOREIGN PATENT DOCUMENTS

| | | | |
|---|---|---|---|
| 6922018 | 8/1969 | Germany | A01F 15/12 |
| 3327042A1 | 2/1985 | Germany | A01F 15/00 |
| 4037040C2 | 6/1991 | Germany | A01F 15/07 |
| 4032788C2 | 4/1992 | Germany | A01F 15/14 |
| 29516789U1 | 2/1996 | Germany | A01F 15/14 |

*Primary Examiner*—H. Shackelford
*Attorney, Agent, or Firm*—Husch & Eppenberger, LLC; Robert E. Muir

[57] ABSTRACT

A round baling press for baling harvested crops has a device for storing a roll of netting web for binding bales. Stones and other foreign bodies thrown into the housing of the baling press can lead to breakdowns and damage to the mechanism for feeding netting web into the baling press. A flexible and plastic web, preferably made of transparent material, is used as an inexpensive and simple housing cover to prevent stones and foreign bodies from entering the housing of the baling press.

12 Claims, 3 Drawing Sheets

PLASTIC COVER FOR BALER NETTING STORAGE DEVICE

BACKGROUND OF THE INVENTION

The present invention relates generally to agricultural machinery and, more particularly, to improvements to balers for harvested crops.

Round balers or baling presses have a chassis; a baling or pressing chamber which is defined laterally by stationary walls and peripherally, in part, by cylindrical rollers or by endless rotating belts entrained over rotating mounted guide rollers; pick up and feed devices for feeding harvested crop to the baling chamber; and a storage device for storing a roll of net wrapping material for binding the bales. Typically the net is guided into the baling chamber between two feed rollers.

An example of such a baling press is described in DE 3 327 042. As shown in FIG. 1, the device for storing the roll of net wrapping material is located at the front end of the round baling press. In practice, the tractor tires throw small stones and dirt particles into the netting storage device. This problem of small stones and dirt particles thrown into the netting storage device is also encountered, although perhaps to a lesser extent, in round baling presses, whose netting storage device is mounted at the rear. Small stones and dirt particles in the netting storage device may become entangled in the netting, and also may become caught in the feed rollers as the netting is fed into the pressing chamber. The feed rollers are made of with a soft foam rubber coating, or like material, providing the necessary grip to reliably pull the netting from the roll and feed it into the pressing chamber. Hard and sharp stones caught in the feed rollers may damage the foam rubber coating of the feed rollers. Larger stones and foreign bodies may cause damage by bending the feed rollers. It is also desirable to protect the roll of netting from any moisture, such as precipitation, which may adversely affect the coefficient of friction of the netting material.

A sheet metal cover for the netting storage device prohibits a free view of the roll of netting from the tractor. Furthermore, a sheet metal cover for the storage device would be heavy and make it difficult for the machine operator to open and close the storage device when inserting new rolls of netting. Gas pressure dampers could minimize these disadvantages, but would make the metal cover even more expensive.

An object of this invention is to provide a cover for a storage device for a roll of netting that is inexpensive to make and easy for the machine operator to handle.

SUMMARY OF THE INVENTION

In accordance with the present invention, its objective is achieved by a flexible plastic cover for the device for storing the roll of netting. Plastic is inexpensive and can be cut to fit with minimal manipulation. The plastic sheet does not require welding, riveting, painting, or protection against rust. The impact of stones thrown against the plastic sheet does not cause paint damage or ensuing rust spots. Water runs off the plastic surface easily.

In a preferred embodiment, the plastic sheet is transparent, allowing the tractor operator to estimate by a brief glance the remaining available netting and to monitor the binding operation. The plastic sheet may be secured by a pivotable rod resting on top of the plastic sheet's exterior. Thus, when the diameter of the roll of netting decreases, as it is pulled out of the storage device and fed into the bailing chamber, the flexible plastic sheet is kept adjacent the roll, preventing wind and/or water from entering the storage device. If the diameter of the roll of netting is large, the space between the plastic sheet and the roll of netting can be maintained by an appropriately designed brake rod between the plastic sheet and the roll of netting. This prevents the roll of netting from rolling against and scratching the interior surface of the plastic sheet.

BRIEF DESCRIPTION OF THE DRAWINGS

Reference is now made to the drawings which illustrate the best known mode of carrying out the invention and wherein the same reference numerals indicate the same or similar parts throughout the several views.

DETAILED DESCRIPTION

Figure 1:
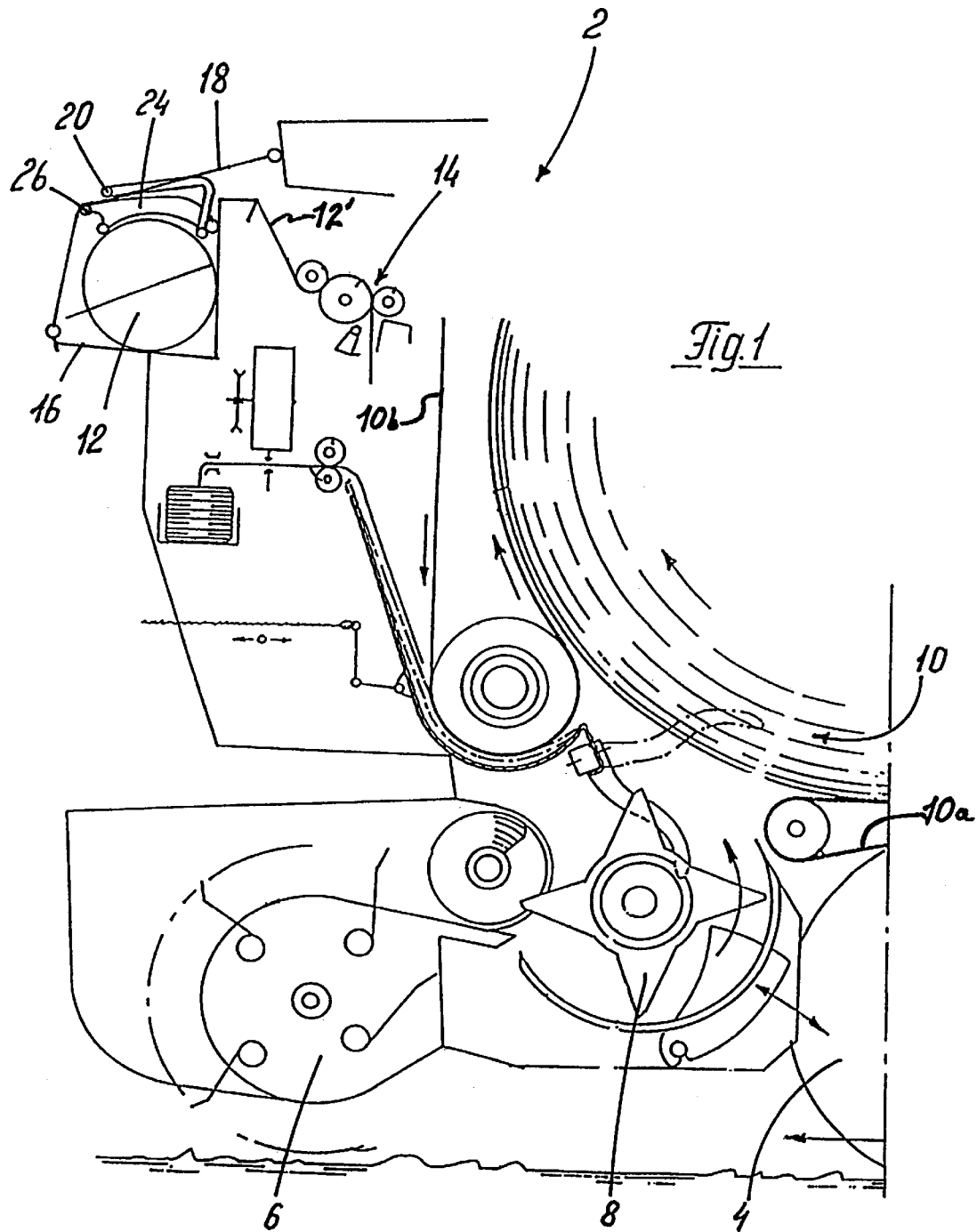
FIG. 1 is a side view of a round baler with a netting binding device.

FIG. 1 shows a round bailer or baling press 2 having a chassis which included a main frame (not shown) and wheels 4. A pick-up device 6 for the harvested crop material and a cutting device 8 are upstream of a pressing chamber 10 into which the crop material is fed. A bale of compressed material is shown in stylized form filling the pressing chamber 10. Instead of belts 10a, 10b shown in the illustrated example, the bailing chamber 10 can be defined circumferentially by cylindrical pressing rollers (not shown) spaced apart from each other roughly in a circle or a combination of belts and pressing rollers. A roll 12 of netting is shown as the binding means in FIG. 1. A netting web 12' is pulled off the supply roll 12 by a group of feed rollers 14 and directed through a feed opening into the bailing chamber 10. To obtain a better grip, the feed rollers 14 can be coated with a foam rubber coating or another coating which similarly increases grip. The bale of compressed material is wrapped with the netting web inside the bailing chamber 10 before being ejected from the bailing chamber as a finished bale. The roll of netting 12 is stored in a housing 16, or stored on a shaft (not shown) or on storage mandrels (not shown). To ensure the netting web 12' can be wound firmly around the bale of compressed material, it is necessary to brake the roll of netting 12. This can be accomplished, for example, by a brake arm which is additionally biased onto the roll of the netting 12 by a spring or a motor. This can also be accomplished by a brake disc arranged non-rotatably on the storage shaft or by other comparable devices. The braking force may also be controlled as a function of time or as a function of the diameter of the roll of netting 12.

Figure 2:
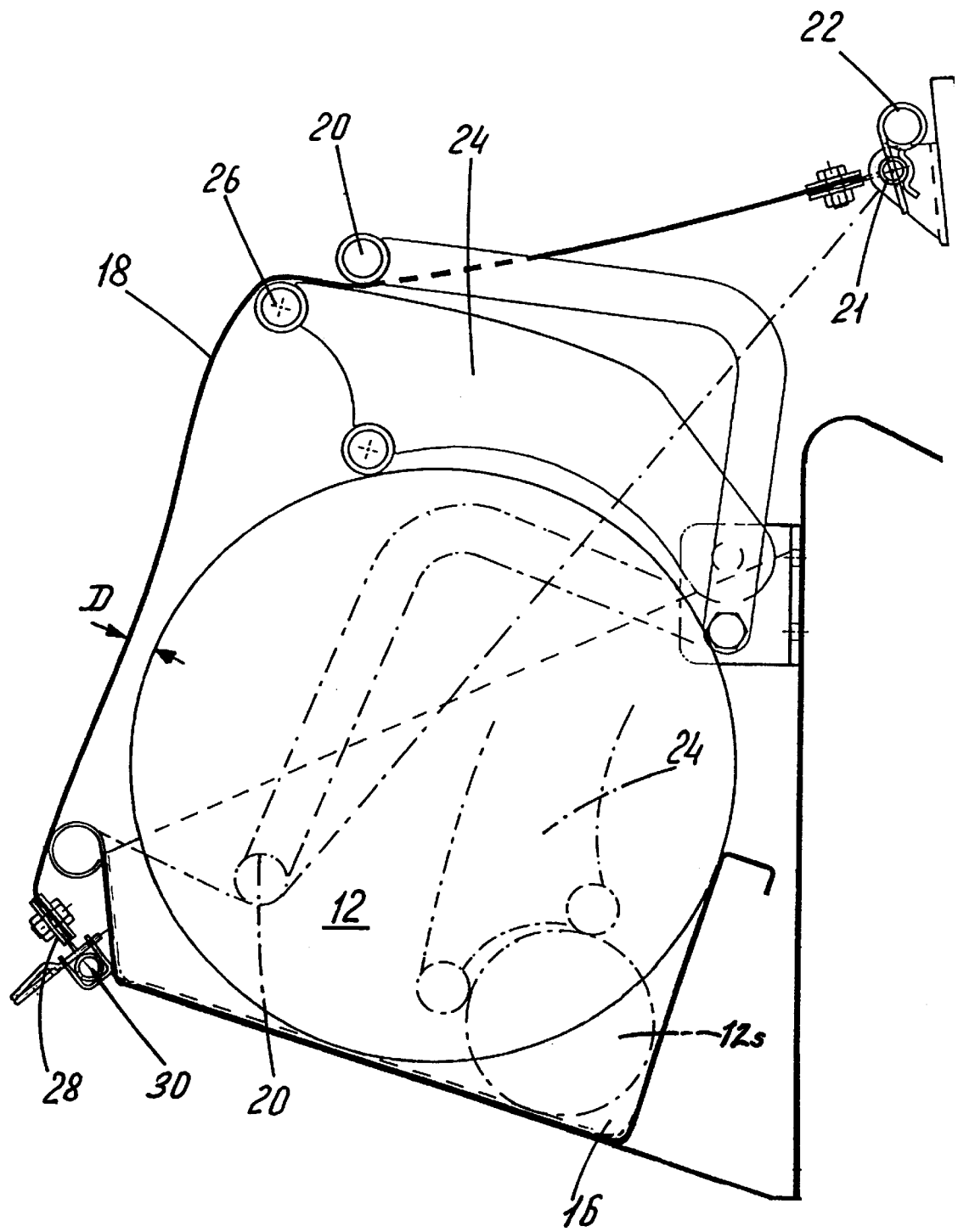
FIG. 2 is an enlarged side view of the netting binding device with a cover in closed position.

As best seen in FIG. 2, the housing 16, and hence the roll of netting 12, is covered by a flexible and generally transparent plastic sheet 18, pivotally attached to a side wall of the housing 16. A pivotally-mounted rod 20 rests on top of the plastic sheet 18, pressing the plastic sheet 18 downwardly and holding it in position.

FIG. 2 shows an enlarged cross-section of the housing 16. A large diameter roll of netting 12 is shown in solid lines. The plastic sheet 18 advantageously covers the top of the housing 16 and may cover the sides thereof. The upper end of the plastic sheet 18 is attached to a rotatably mounted rod 21. A cotter pin 22 prevents the rod from falling out of its mounting. For disassembling the plastic sheet 18, only the cotter pin 22 has to be removed; and vice versa for assembling. After removing the cotter pin 22, the rod 21 can be placed in its mounting or taken out of its mounting by lateral displacement along with the attached plastic sheet 18.

A handle bar 28 is attached to the lower end of the plastic sheet 18. The handle bar 28 serves the purpose of holding the end of the plastic sheet 18 in place. For example, a tube section 30 attached to the handle bar 28 can be latched as shown. The weight of the handle bar 28 also pulls the plastic sheet 18 downwardly, further effecting the covering of the housing 16.

A brake linkage device 24 rests on the roll of netting 12. The brake linkage device 24 is designed in such a way that its front rod 26 maintains a distance "D" between the plastic sheet 18 and the roll of netting 12. As the diameter of the roll of netting 12 decreases, the brake linkage device 24 lowers and the front rod 26 slides along the inner surface of the plastic sheet 18. The front rod 26 is designed to maintain a pivot path which keeps the plastic sheet 18 at least a minimum distance "D" from the peripheral surface of the roll of netting 12. The phantom lines show the position of the brake linkage device 24, the pivotable rod 20, the plastic sheet 18, and the roll of netting 12s when the diameter is small.

Figure 3:
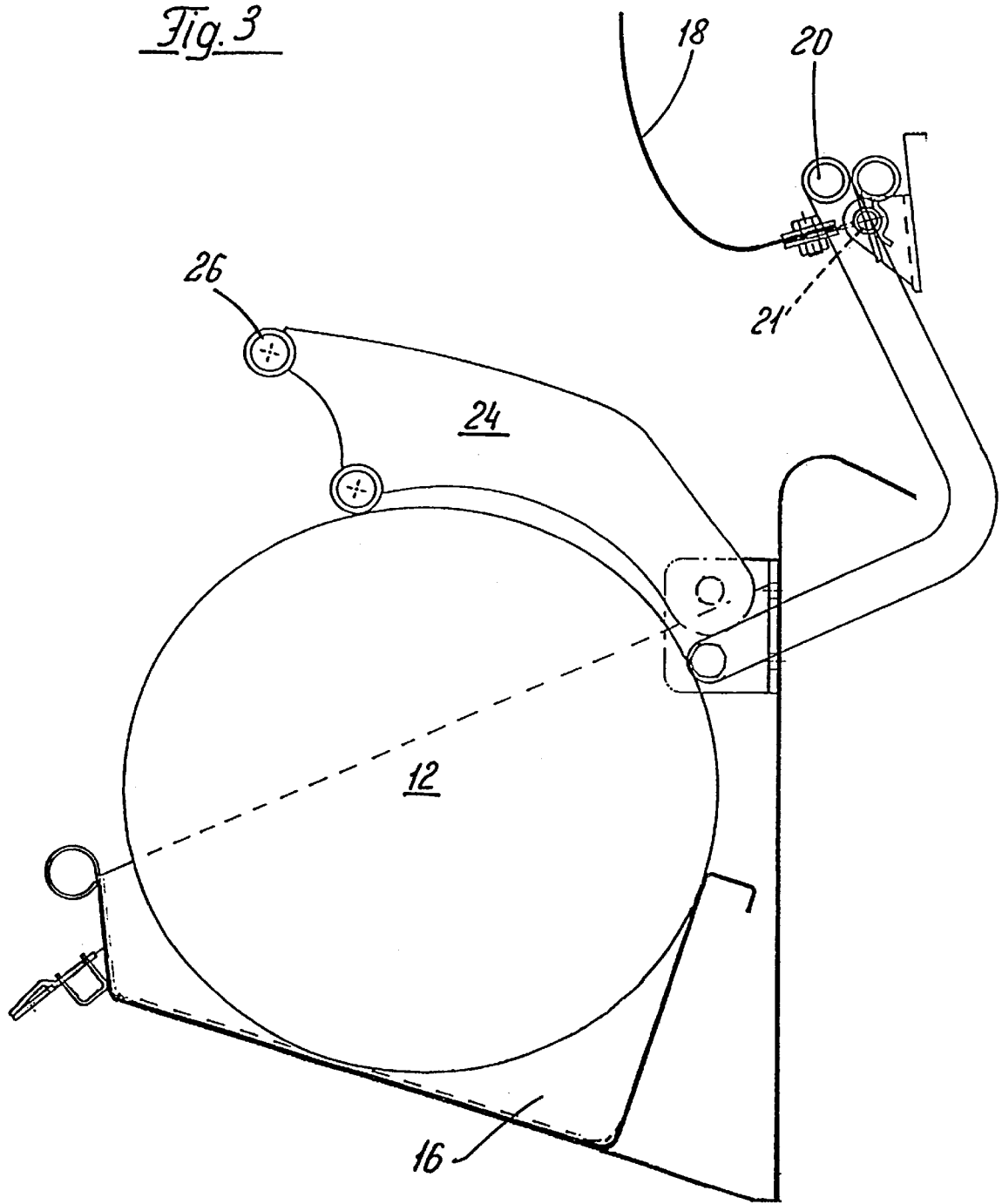
FIG. 3 is an enlarged side view of the netting binding device, as show in FIG. 2, with the cover in open position.

FIG. 3 shows the plastic sheet 18 in an open position. To replace the roll of netting 12 or to undertake maintenance work on the feed rollers 14, the pivotable rod 20 may first be swung upwardly into a release or disengaged position as shown. Then the plastic sheet 18 can be pivoted upwardly, allowing free access to the housing 16.

Other objects, features and advantages will be apparent to those skilled in the art. While preferred embodiments of the present invention have been illustrated and described, this has been by way of illustration and the invention should not be limited except as required by the scope of the appended claims.

I claim:

1. In a round baler for baling harvested crops and having a chassis, means on the chassis defining a baling chamber for compressing the harvested crop, a pick-up apparatus for feeding the harvested crop to the baling chamber, and a storage device for storing a roll of netting for binding the bale; the improvement comprising a cover for the storage device comprising of a flexible plastic sheet and means for moving the flexible plastic sheet so that it can lie adjacent rolls of different diameters.

2. A round baler according to claim 1, wherein said flexible plastic sheet is generally transparent.

3. A round baler according to claim 1, wherein said means for moving said flexible plastic sheet includes a pivotable rod resting on the exterior of the top of the plastic sheet.

4. A round baler according to claim 1, including a brake rod resting between the roll of netting and the plastic sheet for maintaining a space between the plastic sheet and the roll of netting.

5. A round baler according to claim 1, wherein said plastic sheet is attached at one lateral end to a rotatably mounted rod.

6. A round baler according to claim 5, wherein said rotatably mounted rod is mounted adjacent the baling chamber.

7. A round baler according to claim 1, wherein one end of the plastic sheet is connected adjacent the baling chamber.

8. A round baler according to claim 1, including a bar attached at one lateral end of the plastic sheet.

9. A round baler according to claim 8, wherein said bar is releasabley connected to the storage compartment.

10. A baler for baling harvested crops and having a chassis; means on the chassis defining a baling chamber for compressing the harvested crop into a bale; a pick-up apparatus for feeding the harvested crop to the baling chamber; a storage device adjacent the bailing chamber for storing a roll of netting for binding the bale; and a cover for the storage device consisting of a flexible and generally transparent plastic sheet; means for moving the flexible sheet so that it can lie adjacent rolls of different diameters; means for moving the flexible sheet so that it can be swung to an open position uncovering the storage device; and the sheet being generally transparent so that the roll in the storage device can be observed.

11. A baler according to claim 10, wherein said means for moving the flexible sheet includes a pivotable rod resting on the exterior of the top of the plastic sheet to push the sheet downwardly and position the same.

12. A baler according to claim 11, including a brake rod resting between the roll of netting and the plastic sheet for maintaining a space between the inside of the plastic sheet and the exterior of the roll of netting.

* * * * *